(12) United States Patent
Grohn

(10) Patent No.: US 6,628,968 B1
(45) Date of Patent: Sep. 30, 2003

(54) PROVIDING TIMING REFERENCE FOR RADIO HEADS

(75) Inventor: Ossi Ilari Grohn, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 503 days.

(21) Appl. No.: 09/704,927

(22) Filed: Nov. 2, 2000

(51) Int. Cl.$^7$ ................................................. H04B 1/38
(52) U.S. Cl. ........................ 455/560; 455/561; 455/502; 455/500
(58) Field of Search ................................. 455/560, 561, 455/502, 500, 422.1, 11.1, 115.1; 370/512

(56) References Cited

U.S. PATENT DOCUMENTS

| | | | |
|---|---|---|---|
| 5,361,294 A | * 11/1994 | Lee et al. | 455/561 |
| 5,388,102 A | 2/1995 | Griffith et al. | |
| 5,555,260 A | 9/1996 | Rinnback et al. | |
| 5,812,951 A | * 9/1998 | Ganesan et al. | 455/560 |
| 6,101,400 A | 8/2000 | Ogaz et al. | |
| 6,185,429 B1 | * 2/2001 | Gehrke et al. | 455/502 |
| 6,256,505 B1 | * 7/2001 | Kingdon et al. | 455/561 |
| 6,336,041 B1 | * 1/2002 | Vatalaro et al. | 455/561 |
| 6,441,747 B1 | * 8/2002 | Khair et al. | 340/870.16 |

FOREIGN PATENT DOCUMENTS

WO  WO 94/28690  12/1994

OTHER PUBLICATIONS

Kessner, David, "Design of a Time–Slot–Interchanger and Other TDM bus Interfacing Issues," IEEE, May 1998. pp. 515–521.

Lev, Valy; Schaeffer, Dennis; Spear, Stephen; "Development of Mobile Communications Systems in a World of Standards: A Case Study," 11312 MRC Mobile Radio Conference, Nov. 13–14–15, 1991, Nice, FR, pp. 145–150.

* cited by examiner

Primary Examiner—Edward F. Urban
Assistant Examiner—Lana Le
(74) Attorney, Agent, or Firm—Coats & Bennett, P.L.L.C.

(57) ABSTRACT

A method and apparatus for supplying a timing signal from a central unit to at least one radio head connected to the central unit via a communications link. The central unit transmits a downlink signal to the radio head(s) via the communications link based on a transmit clock supplied via a clock selector within the central unit. In a first mode, the clock selector supplies a clock signal derived from a network downlink signal received at the central unit, such as from a MSC, as the transmit clock. However, in response to the loss of the network downlink signal, a second mode is entered wherein the clock selector instead supplies a clock signal derived from an uplink clock signal generated by the radio head, such as by a PLL therein, as the transmit clock. Thus, the central unit may supply a reference clock signal to the radio head even when the network downlink signal is temporarily lost.

19 Claims, 3 Drawing Sheets

PROVIDING TIMING REFERENCE FOR RADIO HEADS

BACKGROUND OF THE INVENTION

The present invention relates to the provision of timing reference signals to one or more radio heads.

Many wireless communication systems include one or more radio heads connected to a central unit (e.g., a pico base station) by a wire-based communications link, such as a T1 or E1 line. These high speed, high bandwidth lines typically do not include a separate clock line, but may nevertheless still be used to provide timing reference signals for phase locked loops within the radio heads. The phase locked loops are in turn used to perform a wide variety of tasks, such as carrier frequency synthesis. Typically, a network downlink signal is supplied to the central unit and the relevant timing reference signals are derived from the network downlink signal by an oscillator or other means within the central unit. However, there may be times when the network downlink signal is not available, but it may be desirable for the central unit to continue to provide the timing reference signal to the radio head(s), so as to allow the radio head(s) to continue operation and/or gracefully shut down on-going RF communications.

BRIEF SUMMARY OF THE INVENTION

The present invention provides a method and apparatus for supplying a timing signal from a central unit to at least one radio head connected to the central unit via a communications link. The central unit transmits a downlink signal to the radio head(s) via the communications link based on a transmit clock supplied via a clock selector within the central unit. In a first (normal) mode, the clock selector supplies a clock signal derived from a network downlink signal received at the central unit as the transmit clock. However, in response to the loss of the network downlink signal, a second (secondary) mode is entered, wherein the clock selector instead supplies a clock signal derived from an uplink clock signal generated by the radio head, such as by a PLL therein, as the transmit clock. Thus, the central unit may supply a reference clock signal to the radio head even when the network downlink signal is temporarily lost.

DETAILED DESCRIPTION OF THE INVENTION

The present invention is directed to provision of a timing reference to radio heads; however, an understanding of an entire communications system may be helpful in understanding the context of the present invention. While the following discussion may be couched in terms of a communication system using the TIA/EIA-136 protocol, it should be appreciated that the present invention is not limited thereto and is instead equally applicable to communications systems operating according to a wide variety protocols, including Global System for Mobile Communication (GSM) and Code Division Multiple Access (CDMA) systems.

Figure 1:
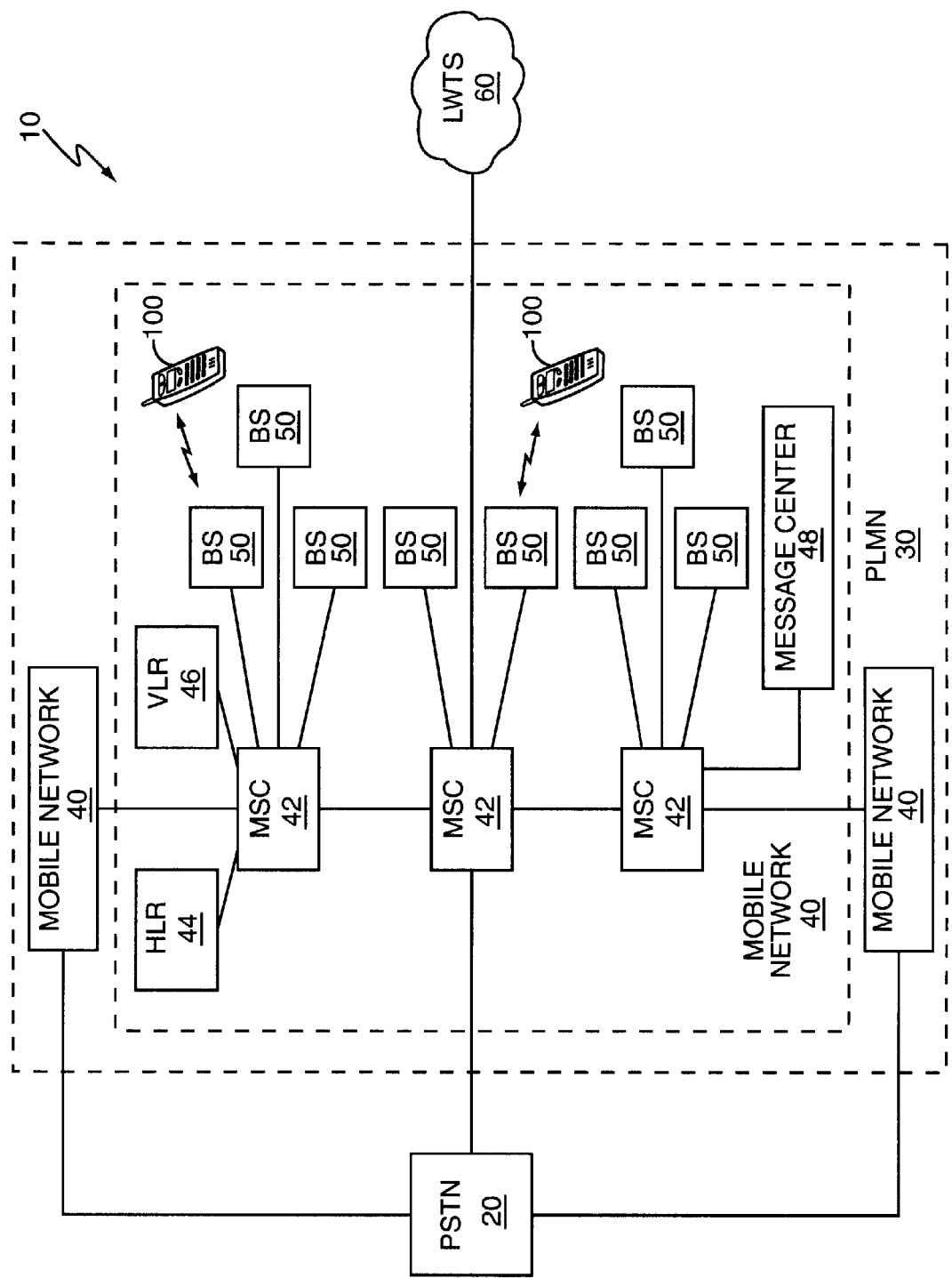
FIG. 1 shows a wireless communication system.

Turning now to FIG. 1, a communication system 10 is illustrated. In particular, the communications system 10 includes the Public Switched Telephone Network (PSTN) 20 and the Public Land Mobile Network (PLMN) 30, which may, in turn, be connected to one or more Localized Wireless Telephone Systems (LWTS) 60. While not shown, satellites may be used as needed either within the PSTN 20 or the PLMN 30 to provide remote communication links, such as across oceans or the like.

The operation of the PSTN 20 is well established and subject to extensive documentation beyond the scope of the present invention and therefore a more detailed discussion is omitted.

PLMN 30 may include a plurality of proprietary mobile networks 40, and each mobile network 40 may include a plurality of Mobile Switching Centers (MSC) 42. Typically, at least one MSC 42 in the PLMN 30, and more advantageously one MSC 42 in each mobile network 40, is connected via a gateway to the PSTN 20. Some MSCs 42 may also serve as gateways connecting the various mobile networks 40 within the PLMN 30. Gateway functions may be all consolidated at a single MSC 42 within a mobile network 40 or dispersed amongst a plurality of MSCs 42 within a mobile network 40 as needed or desired. Typically, at least one MSC 42 within a particular mobile network 40 connects to, or includes, a Home Location Register (HLR) 44 and a Visitor Location Register (VLR) 46, whose functions are well known in the art. Additionally, each mobile network 40 may be equipped with a message center 48 communicatively connected to an MSC 42 for handling short message service and the like. Each MSC 42 may further be communicatively connected to a plurality of base stations 50. Each base station 50 may be communicatively connected to one or more mobile terminals 100, typically over an RF communications channel.

The LWTS 60 is a wireless telecommunications system that may be public or proprietary as needed or desired, and is typically a private network installed in a building or on a campus. LWTSs 60 are typically installed to allow employees working in the building or on the campus to use a mobile terminal 100 as an office telephone. LWTS 60 typically connects with an MSC 42 in the PLMN 30 to allow subscribers of the LWTS 60 to move seamlessly between the LWTS 60 and the PLMN 30. The MSC 42 responsible for a LWTS 60 may treat the LWTS 60 merely as another base station 50 or a plurality of base stations 50 depending on the internal structure of the LWTS 60 in question. One of many configurations of a LWTS 60 is shown in more detail in FIG. 2.

Figure 2:
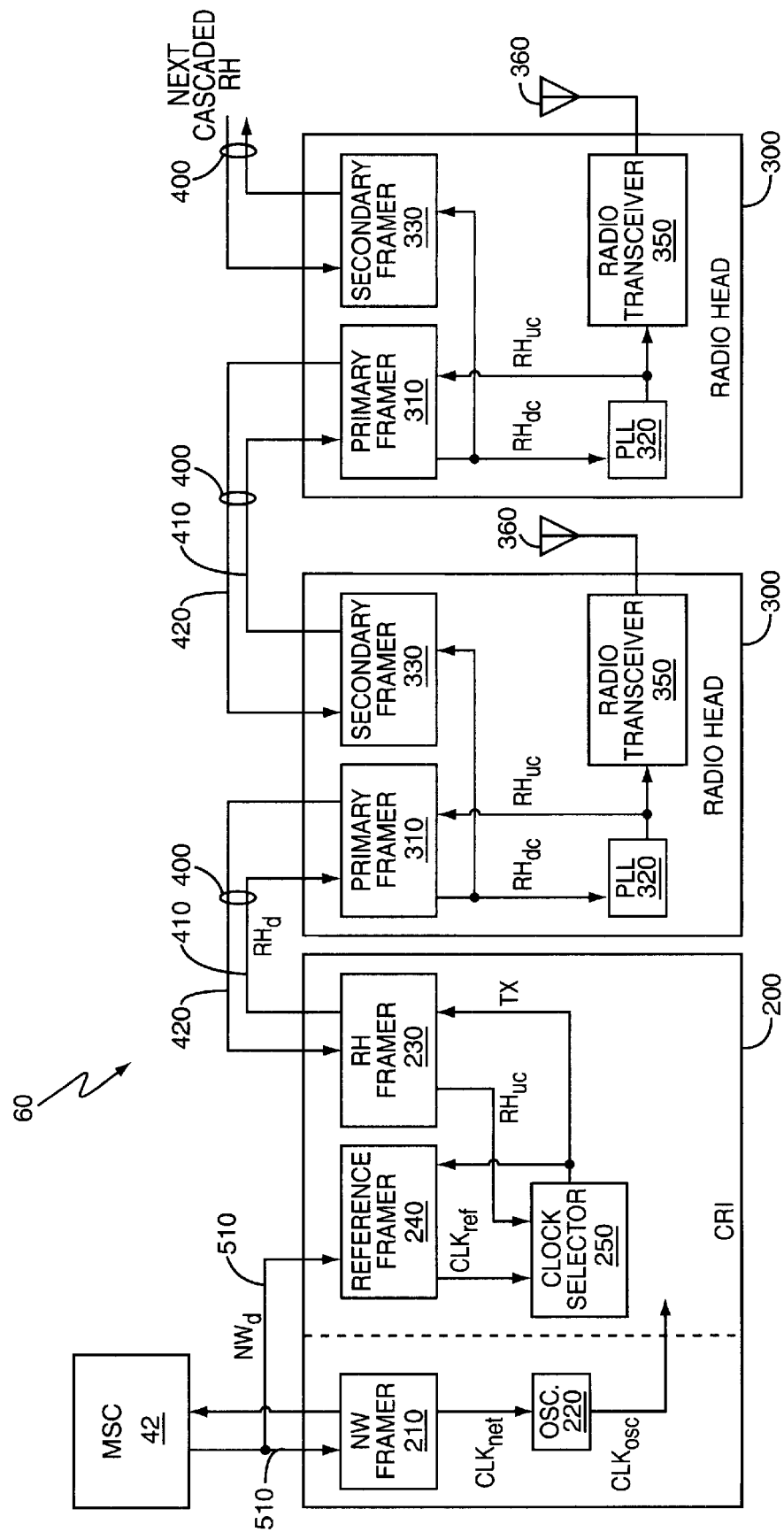
FIG. 2 shows one configuration of a Localized Wireless Telephone System suitable for practicing the present invention.

The LWTS 60 of FIG. 2 includes a control and radio interface (CRI) 200 connected to one or more radio heads (RH) 300. While only two radio heads 300 are depicted in FIG. 2, it should be understood that numerous radio heads 300 may be, and typically are, employed, with the radio heads 300 arranged in one or more chains connected to the CRI 200. Each radio head chain may have a serial (cascaded) or parallel configuration, as appropriate. The radio heads 300 communicate with the CRI (or "central unit") 200 via one or more communications links 400 that may each be conceptually thought of as having downlink 410 (CRI to radio head) and uplink 420 (radio head to CRI) portions. The communications link 400 typically takes the physical form of one or more T1 or E1 lines, but may take other forms known in the art. It should be noted that T1 and E1 lines typically employ pulse code modulation, but the communications link 400 may employ other modulation techniques as is known in the art.

Each radio head 300 typically includes a primary framer 310, a phase locked loop 320, a secondary framer 330, a transceiver 350, and an antenna 360. The radio head downlink signal $RH_d$ from the CRI 200 via downlink 410 is input to the primary framer 310. Primary framer 310 receives the radio head downlink signal $RH_d$ and extracts the downlink data (or "payload") therefrom. In addition, the primary framer 310 recovers the clock signal (the "radio head downlink clock signal" $RH_{dc}$) which may be advantageously embedded in the radio head downlink signal $RH_d$. The primary framer 310 outputs $RH_{dc}$ and a payload signal. The payload signal is forwarded to appropriate parts of the radio head 300 for processing in a conventional fashion. The $RH_{dc}$ clock signal is forwarded to the phase locked loop 320.

Within each radio head 300, the phase locked loop (PLL) 320 generates a phase locked output signal that may be used for a variety of purposes, such as for carrier frequency reference by transceiver 350, and as a transmit clock for uplink transmissions by primary framer 310. For ease of reference, this output signal will be referred to as the uplink clock signal $RH_{uc}$, although it should be understood that $RH_{uc}$ may be used for purposes other than an uplink transmit clock. For instance, $RH_{uc}$ may be used as the carrier frequency source for the RF transmissions from transceiver 350 via antenna 360. The PLL 320 is operable in at least two modes. In the first mode, which is the normal operating mode, PLL 320 generates $RH_{uc}$ based on the $RH_{dc}$ clock signal. In the second mode, which may be thought of as a "holdover" mode, PLL 320 generates $RH_{uc}$ independently from the current $RH_{dc}$. In the holdover mode, PLL 320 freezes the frequency of its output, such as by holding constant the control voltage supplied to the voltage controlled oscillator within the PLL 320. Thus, the output of PLL 320 is not adjusted based on $RH_{dc}$ in the holdover mode. The conditions under which PLL 320 changes from normal mode to holdover mode are explained further below.

The transceiver 350 transmits signals via antenna 360 based on the payload information extracted by primary framer 310 and a suitable carrier frequency source, such as $RH_{uc}$ from PLL 320.

The secondary framer 330 outputs a signal on the downlink 410 of the communications link 400 for the next radio head 300 based on the payload signal from primary framer 310 (after any suitable processing) and a suitable transmit clock signal. This process repeats in each of the radio heads 300. At the last radio head 300, the secondary framer 330 transmits to the previous radio head 300 on the uplink 420, rather than to a subsequent radio head 300 on the downlink 410. For the uplink signal, the secondary framers 330 extract the uplink payload and pass the same towards the primary framer 310, typically with some intervening processing to add information from the current radio head 300. The primary framer 310 transmits the information up the chain on the uplink 420, with the first radio head 300 in the sequence (i.e. connected most directly to the CRI 200) passing the information to the CRI 200.

Both the primary framers 310 and the secondary framers 330 of radio head 300 use respective transmit clock signals to control their respective uplink and downlink transmissions on communications link 400. The transmit clock signal for the secondary framer 330 may be the $RH_{uc}$ signal from the PLL 320 within the same radio head 300. However, the secondary framer 330 may advantageously use the $RH_{dc}$ clock signal output from the primary framer 310 as its transmit clock signal as described in U.S. patent application Ser. No. 09/666,446, filed Sep. 21, 2000 and entitled "Cascaded Parallel Phase Locked Loops," which is incorporated herein to the extent it does not conflict with the disclosure herein. The transmit clock signal for the primary framer 310 (for uplink data) is the $RH_{uc}$ signal supplied by PLL 320.

The CRI 200 serves primarily as the interface between the MSC 42 and the radio heads 300. The CRI 200 may oversee or perform the functions of control of air channels, control of radio heads 300, routing of data to and from the radio heads 300, and the like. Most of these functions are well known in the art and are not discussed further herein. Relevant to the present invention, the CRI 200 provides timing reference signal(s) to the radio heads 300, such as for air frame synchronization and carrier frequency reference. For simplicity in explaining the present invention, primarily those CRI components related to providing the timing reference are shown in FIG. 2, but the CRI 200 of FIG. 2 is to be understood to include other functional components known in the art.

The CRI 200 may include a network (NW) framer 210, an oscillator 220, one or more radio head (RH) framers 230, a reference framer 240, and clock selector 250. The network framer 210 receives input, sometimes referred to herein as the "network downlink signal," ($NW_d$) from the MSC 42 via downlink 510 and processes that $NW_d$ signal in a conventional fashion to extract payload information. Because downlink 510 is typically in the form of T1 or E1 lines, the $NW_d$ signal may advantageously include an embedded clock signal. The network framer 210 outputs a payload signal and a clock signal ($CLK_{net}$) based on the $NW_d$ signal. The payload signal is directed to the appropriate portions of the CRI 200 for internal data processing, as is known in the art. The $CLK_{net}$ clock signal is sent to the oscillator 220, typically a phase locked loop, for generation of the CRI internal clock signal $CLK_{osc}$. This $CLK_{osc}$ internal clock signal may be used in a conventional fashion to control various processes within the CRI 200, such as the processing of the payload information within the CRI 200 and as a transmit clock for uplink transmissions to the MSC 42 from network framer 210.

The $NW_d$ signal input from the MSC 42 via downlink 510 is also directed to the reference framer 240. The reference framer 240 may extract the embedded clock from $NW_d$ to produce a clock signal that will be referred to as the reference clock signal $CLK_{ref}$. There is no need for the reference framer 240 to generate a payload signal for internal use within the CRI 200, as this is handled by the network framer 210. As such, the reference framer 240 may operate in a monitoring mode, meaning that the reference framer 240 should present high impedance to downlink 510 so as to not overload downlink 510. The $CLK_{ref}$ signal is forwarded to the clock selector 250, as described further below.

The radio head framer 230 operates in a conventional fashion to send the radio head downlink signal $RH_d$ to radio heads 300. In addition, radio head framer 230 serves to extract the uplink clock signal $RH_{uc}$ from the uplink signal forwarded by radio head 300 and forward the same to the clock selector 250.

In the present invention, the $RH_d$ signal generated by the radio head framer 230 is controlled by the transmit clock signal supplied to the radio head framer 230 by clock selector 250. The source for that transmit clock signal is normally the reference clock signal $CLK_{ref}$ generated by the reference framer 240. That is, in normal mode, the clock selector 250 supplies clock signal $CLK_{ref}$ as the transmit clock signal for radio head framer 230. Alternatively, $CLK_{net}$ may be routed to the clock selector 250, and $CLK_{net}$ may be supplied as the transmit clock signal to radio head framer 230 during normal mode operation. However, as discussed above, both $CLK_{net}$ and $CLK_{ref}$ are based on the network downlink signal $NW_d$, which may not be present from time to time due to problems at MSC 42 or problems with downlink 510. When $NW_d$ is not present on downlink 510, referred to as a loss of signal condition, the generation of $CLK_{net}$ and $CLK_{ref}$ are obviously problematic. In response to the detection of a loss of signal condition, the clock selector 250 enters another mode, sometimes referred to herein as secondary mode, where the clock selector 250 supplies the $RH_{uc}$ clock signal as the transmit clock for radio head framer 230, instead of $CLK_{ref}$ (or $CLK_{net}$). Thus, the $RH_{uc}$ clock signal generated by radio head 300, supplied to the CRI 200 via uplink 420, is used by radio head framer 230 to form the radio head downlink signal $RH_d$, which is supplied to radio head 300 on downlink 410. Because radio head downlink signal $RH_d$ is now based on the $RH_{uc}$ signal generated by the PLL 320, and because $RH_{uc}$ is typically does not have the long-term accuracy of the clock signal from the MSC 42, this secondary mode should be considered a temporary mode and the clock selector 250 should return to normal mode as quickly as possible (upon return of $NW_d$).

Just for reference, most cellular communications standards require a long-term accuracy of 0.016 ppm, or Stratum 2, for the clock signal provided to the CRI 200 from MSC 42, in order that the proper frequency accuracy may be achieved by the transceivers 350 of the radio heads 300. Typically, the signal from the MSC 42 meets the requirements of Stratum 2, but may also meet the higher standard of Stratum 1 (0.01 ppb).

As described above, the communications assembly of the CRI 200 and the radio head(s) 300 has at least two modes. In the normal mode, the clock selector 250 supplies $CLK_{ref}$ (or $CLK_{net}$) to the radio head framer 230 as the transmit clock therefor. In response to detection of a loss of $NW_d$ signal condition, the communications assembly enters the secondary mode where the clock selector 250 supplies $RH_{uc}$ to the radio head framer 230 as the transmit clock therefor. The detection of a loss of $NW_d$ signal condition, and the switching of modes in response thereto, may be carried out in a variety of ways. Just by way of example, a microprocessor in the CRI 200 may monitor the network framer 210 and/or the reference framer 240, looking for an indication that the $NW_d$ signal has been lost. In response to such an indication, the microprocessor may issue appropriate commands to the clock selector 250 to change from normal mode to secondary mode. Further, the microprocessor may cause appropriate commands to be sent to radio head 300 to cause PLL 320 to enter holdover mode. The PLL 320 may then stay in holdover mode for the duration of the loss of signal condition in some realizations of the present invention, or may be commanded by the microprocessor to return to normal mode at some point earlier in other realizations. Another approach that may advantageously be employed is to have the PLL 320 be more autonomous and have the clock selector 250 be more intelligent. The PLL 320 may itself detect an interruption in the $RH_{dc}$ signal caused by the loss of $NW_d$ signal condition and automatically enter the holdover mode until $RH_{dc}$ is restored. In addition, the clock selector 250 may monitor the signal from reference framer 240 and automatically switch from normal mode to secondary mode when $NW_d$ is lost. Because the mode transition of clock selector 250 may not be seamless, there may be a short hiccup in $RH_d$, causing PLL 320 to briefly enter holdover mode. However, once clock selector 250 has completed the transition, radio head framer 230 should resume generating $RH_d$, causing $RH_{dc}$ to be restored, thereby allowing PLL 320 to return to normal mode operation. Thus, PLL 320 may stay in holdover mode for only a short time in some realizations of the present invention.

Figure 3:
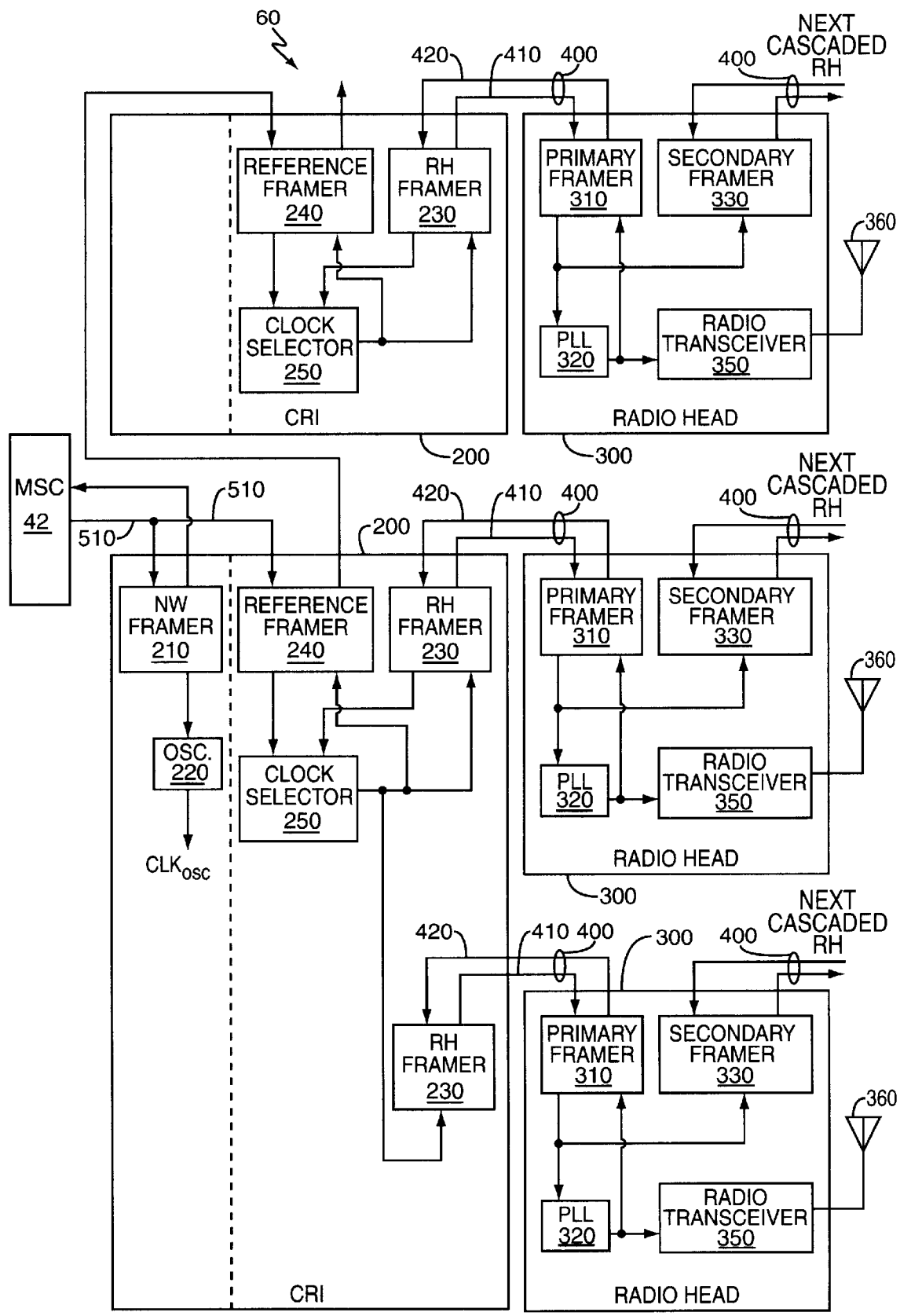
FIG. 3 shows another configuration of a Localized Wireless Telephone System suitable for practicing the present invention.

FIG. 2 shows a single CRI 200 connected to one chain of radio heads 300; this chain may contain either only a single radio head 300 or a plurality of radio heads 300. Further, the present invention may be used in other configurations. For instance, the CRI 200 may be connected to more than one chain of radio heads 300, as shown in FIG. 3. In addition, the CRI 200 may also connect to another CRI 200, also as shown in FIG. 3. In this latter case, it may be advantageous to have the reference framer 240 forward the relevant clock signal to the next CRI 200. That is, both the reference framer 240 and the radio head framer 230 should use the same transmit clock, as supplied via clock selector 250. The downstream CRI 200 may also advantageously employ the technique of the present invention to generate its radio head downlink signal $RH_d$ for its radio heads 300 based on the clock signal from the upstream CRI 200.

As used herein, the term "radio head" means an active communications station with at least RF transmit capability that is fed data to be transmitted from an upstream source. Further, as used herein, the term "mobile terminal" 100 may include a cellular radiotelephone with or without a multi-line display; a Personal Communications System (PCS) terminal that may combine a cellular radiotelephone with data processing, facsimile and data communications capabilities; a Personal Digital Assistant that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals 100 may also be referred to as "pervasive computing" devices.

U.S. patent application Ser. No. 09/705,093, entitled "Providing Reference Signal To Radio Heads," and filed concurrently herewith, is incorporated herein to the extent it does not conflict with the present disclosure.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of supplying a timing signal from a central unit to at least one radio head connected to said central unit via a communications link, said method comprising:
   transmitting a radio head downlink clock signal from said central unit to a first radio head, said radio head downlink clock signal based on a transmit clock signal;
   normally supplying a first reference signal derived from a network downlink signal received at said central unit from an external source as said transmit clock signal;
   generating a second reference signal based on a radio head uplink clock signal sent to said central unit by said first radio head; and
   switching the transmit clock to said second reference signal in response to said central unit detecting loss of said network downlink signal.

2. The method of claim 1 further comprising generating said radio head uplink clock signal by a phase lock loop at said first radio head.

3. The method of claim 2 wherein transmitting said radio head downlink clock signal from said central unit to said first radio head comprises transmitting said radio head downlink clock signal from said central unit to a first radio head as an embedded clock signal.

4. The method of claim 3 wherein said phase lock loop has a first mode wherein said phase lock loop generates said radio head uplink clock signal based on said embedded clock signal and a second mode wherein said phase lock loop generates said radio head uplink clock isolated from said embedded clock signal.

5. The method of claim 4 further comprising an RF transceiver transmitting telecommunications data based on said radio head uplink clock signal while said second reference signal serves as said transmit clock.

6. The method of claim 1 further comprising forwarding said radio head downlink clock signal from said first radio head to a second radio head and transmitting RF telecommunications data based thereon by said second radio head.

7. A method of supplying a timing signal from a central unit to at least one radio head, including at least a first radio head, connected to said central unit via a communications link, said method comprising:
   receiving an external signal at a first framer of said central unit and generating a first reference clock signal based thereon by said first framer;
   using said first reference clock signal as a transmit clock for a second framer, said second framer transmitting a downlink signal to said first radio head via said communications link, said downlink signal comprising an embedded clock signal based on said transmit clock;
   generating an uplink signal at said first radio head based on said embedded clock signal;
   receiving said uplink signal from said first radio head at said second framer and generating a second reference clock signal based thereon by said second framer;
   monitoring for loss of said external signal and in response to detection of loss of said external signal, switching said transmit clock for said second framer from said first reference clock to said second reference clock; and
   thereafter, transmitting a downlink signal to said first radio head via said communications link with said embedded clock based on said second reference clock signal.

8. The method of claim 7 further comprising forwarding said embedded clock signal from said first radio head to a second radio head and transmitting RF telecommunications data based thereon by said second radio head.

9. A communications assembly having a normal mode of operation and a secondary mode of operation, comprising:
   a central unit connected to a first radio head via a communications link and normally receiving a network downlink signal;
   said central unit transmitting a radio head downlink clock signal to said first radio head via said communications link, said radio head downlink clock signal based on a transmit clock signal;
   said first radio head comprising a phase lock loop, said phase lock loop:
   supplying an uplink clock signal to said central unit;
   said central unit comprising a clock selector, said clock selector:
   operable in said normal mode to supply a first reference signal derived from said network downlink signal as said transmit clock signal;
   operable in said secondary mode to supply a second reference signal derived from said uplink clock signal as said transmit clock signal; and
   wherein said assembly switches from said normal mode to said secondary mode in response to said central unit not receiving said network downlink signal.

10. The assembly of claim 9 wherein said first radio head further comprises a primary framer transmitting said uplink clock signal generated by said phase lock loop towards said central unit.

11. The assembly of claim 10 wherein said primary framer also receives said radio head downlink clock signal.

12. The assembly of claim 10 wherein said central unit further comprises a radio head framer transmitting said radio head downlink clock signal to said first radio head via said communications link, said radio head framer also receiving said uplink clock signal and generating said second reference signal based thereon.

13. The assembly of claim 9 wherein said central unit further comprises a first framer normally receiving said network downlink signal and generating said first reference signal based thereon.

14. The assembly of claim 13 wherein said central unit further comprises a second framer, said second framer transmitting said radio head downlink clock signal to said first radio head via said communications link as an embedded clock signal based on said transmit clock signal.

15. The assembly of claim 14 wherein said first radio head further comprises a primary framer transmitting said uplink clock signal generated by said phase lock loop towards said central unit, said primary framer further receiving said embedded clock signal.

16. The assembly of claim 15 wherein said first radio head further comprises an RF transceiver transmitting telecommunications data based on said embedded clock signal in said normal and secondary modes.

17. The assembly of claim 9 wherein said phase lock loop is further:
   operable in said normal mode to generate said uplink clock signal based on said radio head downlink clock signal; and
   operable in said secondary mode to generate said uplink clock signal isolated from said radio head downlink clock signal.

18. The assembly of claim 9 wherein:
   said central unit further comprises:
      a first framer normally receiving said network downlink signal and generating said first reference signal based thereon;
      a radio head framer transmitting said radio head downlink clock signal to said first radio head via said communications link as an embedded clock signal based on said transmit clock signal, said radio head framer also receiving said uplink clock signal and generating said second reference signal based thereon;
   said first radio head further comprises:
      a primary framer receiving said embedded clock signal and transmitting said uplink clock signal generated by said phase lock loop towards said central unit; and
      an RF transceiver transmitting telecommunications data based on said embedded clock signal in said normal mode and transmitting telecommunications data based on said uplink clock signal in said secondary mode.

19. The assembly of claim 9 further comprising at least a second radio head connected to said central unit via said first radio head; said second radio head receiving said radio head downlink clock signal and transmitting RF telecommunications data based thereon.

* * * * *